United States Patent [19]

Lazcano-Navarro

[11] Patent Number: 4,957,546
[45] Date of Patent: Sep. 18, 1990

[54] DIRECT STEELMAKING PROCESS FROM 100% SOLID CHARGE OF MULTIPLE REDUCING AND OXIDIZING ALTERNATING PERIODS

[75] Inventor: Arturo Lazcano-Navarro, Saltillo, Mexico

[73] Assignee: Instituto Mexicano de Investigaciones Siderurgicas, Saltillo, Mexico

[21] Appl. No.: 349,650

[22] Filed: May 10, 1989

[51] Int. Cl.$^5$ .............................................. C21B 11/00
[52] U.S. Cl. ........................................ 75/529; 75/532; 75/958
[58] Field of Search ................. 75/40, 43, 44 RS, 51.2

[56] References Cited

U.S. PATENT DOCUMENTS

| 4,198,230 | 4/1980 | Brotzmann et al. | 75/43 |
| 4,531,973 | 7/1985 | Nixon | 75/73 |

Primary Examiner—Melvyn J. Andrews
Attorney, Agent, or Firm—Laurence R. Brown

[57] ABSTRACT

The present invention relates to a new steelmaking process and apparatus which operates on an intermittent basis where several cycles composed of reducing and oxidizing periods are performed to create sufficient energy for melting of solid metallic charge, i.e., sponge iron, scrap, iron ore. During the reducing period, oxygen and carbonaceous material are injected through the vessel bottom thus attaining both carburization of a steam of the melt and generation of $CO+H_2$ rich gas, and when the dissolved carbon of the melt is in the range of 3%–4%, conditions are then changed to the oxidizing period where solid metallic charge is added initially while oxygen injection is maintained, and until the solid charge has been melted, thus generating a stream of $CO+CO_2$ gas rich in CO. In addition, other fluids and solids participate in the process, i.e., nitrogen, hydrocarbons, fluxes, and are used according to the appropriate period of the process. After several cycles have been performed, molten metal, preferably raw steel, is transferred to a ladle for further processing and an ignition molten metal heel remains in the vessel for initiation of the next heat.

8 Claims, 3 Drawing Sheets

DIRECT STEELMAKING PROCESS FROM 100% SOLID CHARGE OF MULTIPLE REDUCING AND OXIDIZING ALTERNATING PERIODS

BACKGROUND OF THE INVENTION

There have been proposed several alternative processes normally grouped under the title of "smelting reduction" processes, in which the use of carbonaceous material through addition or injection in a vessel containing molten metal aims at primary objectives departing from obtaining liquid steel within the same reactor. Such is the case of processes where the vessel can be considered as a coal gasification unit, and thus the metal produced is of secondary importance, or else in processes grouped under the title of "direct steelmaking" processes, where the gases generated are further oxidized, i.e., postcombusted within the same vessel aiming at the achievement of extra energy. However, this last aspect is widely recognized to be a low energy efficient process since heat that could be transferred to the metal is well below 50% in reference to that generated by postcombustion of gases. This situation also limits further use of the gases for direct reduction process application or as a fuel combustion gas in other processes.

The above mentioned processes require preferably the use of carbonaceous materials with high fixed carbon and low ash contents in order to increase the amount of solid metallic charge to be melted in the vessel. These carbonaceous materials in most of the cases are known to be in decreased availability, such as in the case of antracite or as in the case of by products such as coke, breeze or lignite coke which additionally have the disadvantage of being more expensive.

The processes that use the generated gases for direct reduction purposes, i.e., no postcombustion is practiced, also grouped as "direct steelmaking" processes, are said to operate in a non-repeated two basic period type of practice, the main period being the simultaneous injection of carbonaceous material and oxygen and the addition of solid metallic charge, e.g., sponge iron, during a relatively prolonged period of time in an attempt to achieve both nearly constant melt carbon content and temperature at stationary conditions, as measured by decarburization rate of melt being (dc/dt) around zero, until a given volume of molten metal is completed. The final period is relatively short in time and performed under oxidizing conditions for refining of the metal to a degree where steel can be tapped, or a metal for further treatment is obtained. There clearly exists an inherent difficulty to control process variables and desired conditions when the mass is incremented with time, such variables including rates of injection and additions of solid metallic charge, carbonaceous material, oxygen, fluxes for slagging impurities, and such conditions, including composition of the melt as measured by carbon content and melt temperature.

According to the inventor's experience, it has been found that it is not possible in practice to exert an effective control of the process to achieve such mentioned stationary or steady state condition while the mass is being increased. Furthermore, the inventor's work has proved that by using multiple alternating and separated reducing and oxidizing condition periods, including the addition of solid charge during the initial stage of the oxidizing period, it is possible to overcome the control difficulties mentioned and achieve the performance required by the process.

SUMMARY OF THE INVENTION

It is thus an object of the present invention to provide a process for obtaining raw steel and molten iron where oxygen and carbonaceous material are introduced into a molten metal bath. By alternating of several oxidizing and reducing condition periods, allowance is made in a controllable manner for melting of substantial amounts of solid charge, the total amount melted being equal to a one heat size. Furthermore, the gases generated during the cited periods are not postcombusted and are collected for further use in a direct reduction process, and in other processes where the gas is to be applied as a combustion fuel.

Several other advantages and features of the process, which will become more readily apparent from the following description, are also within the spirit of the present invention.

Figure 1:
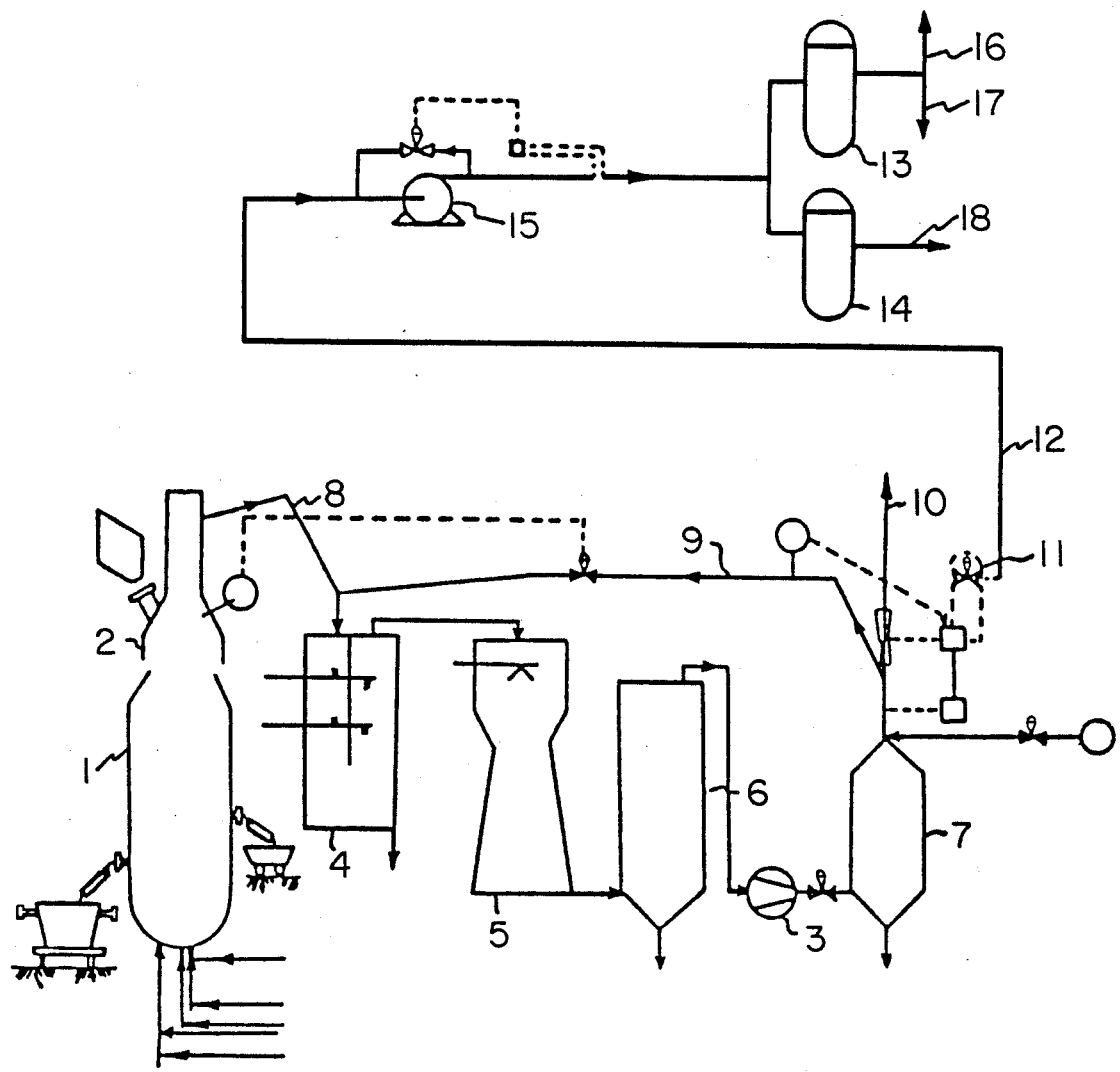
In FIG. 1 a schematic illustration of the process is shown and it indicates the basic apparatus and the way the stream of gases is handled.
Figure 2:
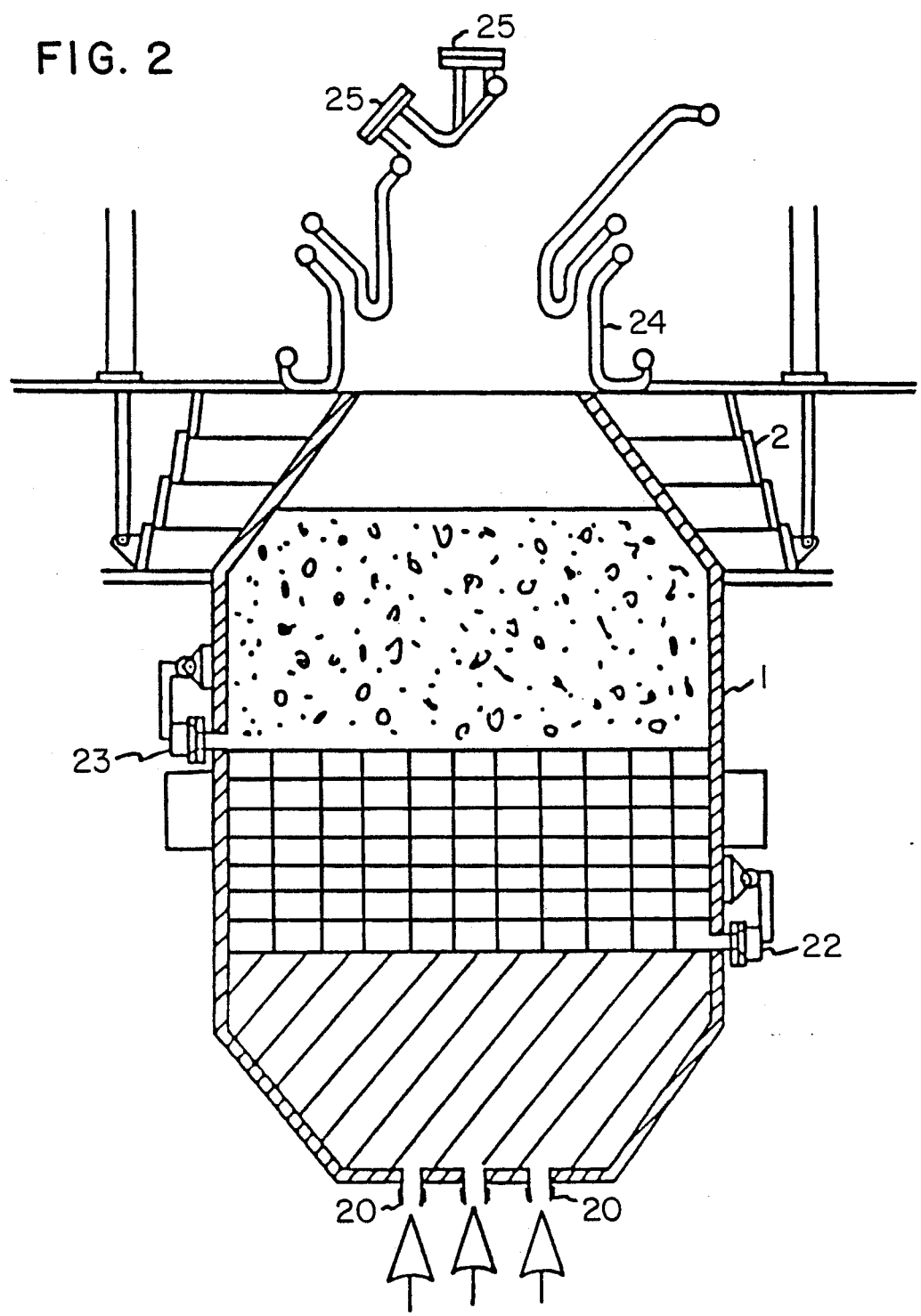
FIG. 2 and 3 schematically show the metallurgical vessel general arrangement as represented in a side and them view, respectively.
Figure 3:
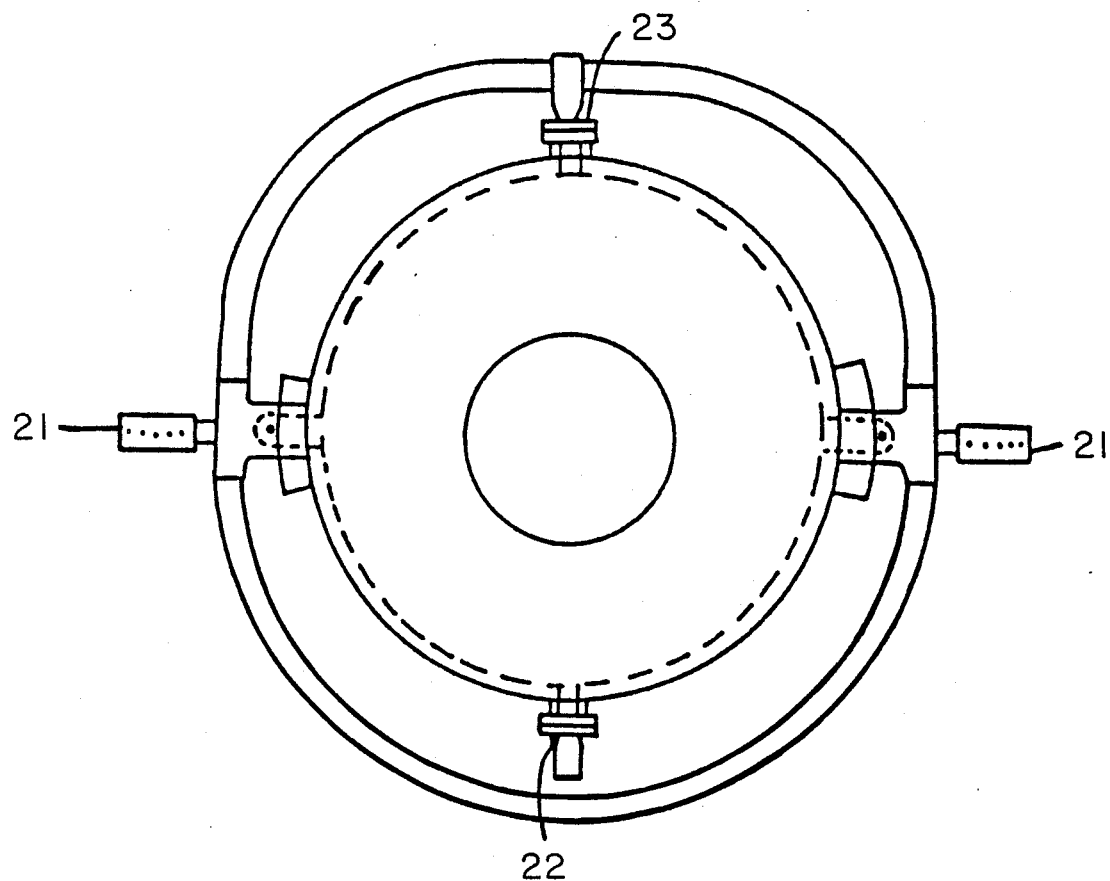

The detailed illustration of the drawings will become more apparent from the following description in which reference is made to the figures shown.

DESCRIPTION OF THE INVENTION

The process is started by a reducing or oxidizing period, depending upon the carbon content of a previously contained liquid ignition metallic heel: when the carbon content of the metallic heel is in the range of 2% to 4%, an oxidizing period is carried out, whereas, when the carbon content of the metallic heel is lower than 2%, a reducing period is performed. The process is continued with alternating periods of reducing and oxidizing conditions, which together compose a cycle, and after several cycles have been completed the process reaches a stage where a heat size of raw steel or molten iron for further treatment is obtained and transferred to a ladle, leaving within the vessel a liquid metal ignition heel for the beginning of another group of said cycles. The metallurgical operations carried out during the reducing period involve the simultaneous injection of carbonaceous material and oxygen in such a way that an effective carburization rate is attained, as measured by the carbon content of the melt. Thus carbon in the melt increases with time during the period, and such period is characterized by a condition defined by %C in the melt with respect to time (d%C/dt) as being positive, while in the oxidizing period preferably exclusively oxygen is injected in such a way that a net decarburization is obtained and defined as (d%C/dt), being negative, meaning that a lower carbon content is measured at any time within said period where also the heat generated is used for the melting of solid metallic charge, e.g., sponge iron, which is charged to the vessel as a batch addition during the initial part of the oxidizing period, thus determining the duration of such period when complete melting of such solid charge addition is achieved. The alternating cycles are performed several times until a defined volume of metal has been completed thus reaching the stage at which raw steel or molten metal for further refining is ready to be tapped into a ladle. Referring to the drawings, the process is carried out in vessel (1) with bottom injection of: carbonaceous material, oxygen, hydrocarbons, fluxes, and top addition of solid metallic charge and lumpy fluxes. The top of the vessel is sealed with a retractable bell (2) to minimize air entance. The hot gas (8) produced during oxidizing and reducing periods enters a cooling and wet cleaning system (4), (5) and (6) and through a moisture separator (7); the fan (3) drives the gas outside of the cleaning system towards the stack (10). By means of the valve (11) it is possible to store such gas separately depending on the process condition i.e. oxidizing or reducing periods. During the reducing period the gas (12) is stored in the gas holder (13) after passing through the compressor (15). The stored gas can be sent to a direct reduction of iron ore process (16) or a combustion process (17). During the oxidizing period, the gas (12) is stored in the gas holder (14) through the compressor (15). The stored gas can be sent to a combustion process (17).

The vessel (1) has a specially designed refractory lining to withstand both process conditions, i.e., oxidizing and reducing. The hood (19) has air tight nitrogen purged domes (25) to allow introduction of solids charge additions without interrupting the process and also for introduction of a sublance (not shown) to evaluate conditions of the metal in the bath through temperature measurement, carbon and sulphur analysis and sample retrieval for further chemical composition evaluation. The hood is complemented by a telescope type, retractable lower bell (2) that ensures minimum or nil entrance of air, all said seals designed and used to avoid postcombustion of the gas by air intake and keep the richest composition of CO gas produced during any of the periods of the process. The generated gas compositions are continuously monitored after they have been cleaned and before they are sent to one or several gas holders (13) and (14) for storage, and to the atmospheric stack (10) for burning, depending upon their composition, where one holder is used for gas rich in $CO + H_2$ (13) and another for gas rich in CO (14).

The vessel (1) is adapted with bottom tuyeres (20) where fluids and solids are injected into the melt, and the tuyeres are connected to a rotary joint (21) located in the vessel trunnion serving independent distribution lines of fluids, being mainly nitrogen, natural gas or other liquid/ gaseous hydrocarbons, oxygen, and said solids being carbonaceous powdered matter and flux agents such as lime. The metallurgical vessel (1) has two notches (22) and (23) at barrel position: the steel notch (22) is located below the vessel retaining ring and at a position defined by the ignition heel level. The slag notch (23) is located 180° apart from the steel notch and is positioned above the retaining ring. The notches allow for tapping of steel or metal and slag, such operations to be carried out without having the vessel to be titled to the horizontal position, also allowing for leaving the desired amount of molten metal to serve as the mentioned ignition heel for the next operation.

The species injected through the tuyeres (20) consist in: the carbonaceous material to allow recarburization of the melt during the reducing period, thus giving the melt latent heat; oxygen to allow oxidation of dissolved carbon in the metal in preference to iron; natural gas or other liquid or gaseous hydrocarbons and nitrogen as coolants for protection of melting off the tuyere tip zone, the nitrogen additionally used as a powdered solids carrier gas, and powdered lime to achieve refining conditions within the melt for desulphurization and dephosphorization purposes. The gases generated vary in volume and composition depending on the rate of addition and quality of carbonaceous material, and the period of blow being reducing or oxidizing, said gas composition being 80% or more $CO + H_2$ when a medium volatile content coal is used during the reducing period of any cycle, and $CO + CO_2$ gas generated during the oxidizing periods. Preferably raw steel is obtained at the end of the cycles above mentioned being a mandatory condition for this metal to be further treated in the ladle, e.g. desulphurized. During the reducing periods, lumpy and/or powdered fluxing agents are introduced to promote refining through desulphurization and dephosphorization of the metal, the lumpy lime addition being principally used to neutralize the gangue introduced through the carbonaceous material and sponge iron, and the final period before tapping consisting mainly in the decarburization to low carbon levels and at same time consisting in increasing the temperature of the metal to permit the tapping of said raw steel heat.

The process object of the present invention has been basically designed to use widely available carbonaceous material such as low, medium and high volatile matter content coking or non coking bituminous coals, although the medium and high volatile types are preferred since they are more abundant. The process is also able to accept a wider variety of carbonaceous materials such as: antracite, coke breeze, petroleum coke, charcoal, fuel oil, any class of oil refining residues and mixtures of the above mentioned materials.

This process has been designed preferably to operate with a previously remaining metallic heel or by adding, after tapping the complete mass of liquid metal produced, a new amount of liquid metal (as starting ignition heel) to reinitiate the process. However, it has the flexibility to prepare said ignition heel in the vessel starting from solid metallic charge. In this last case, a solid charge is made to the vessel and the tuyeres act as burners by injecting oxygen and hydrocarbons to provide sufficient energy to melt said solid charge. Means are provided to blow oxygen by a top lance (not shown) if required according to the solid charge in the vessel.

The following is a description of typical heats performed in a pilot plant installation and is intended solely for illustrative purposes of the process description above mentioned. It also illustrates the inventor's experience in the field of application of the present invention.

EXAMPLE 1

Satisfactory tests performed in a pilot plant vessel of nominal 6 ton capacity consisted in initiation of any trial heat by preheating the refractory lining by bottom injection of oxygen and natural gas, receiving in the vessel 4–6 ton of liquid metal as ignition heel, its composition and temperature as shown in table 1, supplied from an external source, and afterwards alternating reducing and oxidizing periods are carried out. The reducing period conditions, as shown in table 2, involved the injection through bottom tuyeres of oxygen, medium or low volatile coal (see table 3) by nitrogen and natural gas for cooling, the time elapsed to complete the period being 4–6 minutes until a carbon content of 3–4% was achieved in the melt and the off gas reach in $CO + H_2$ obtained is shown in table 4 for low and medium volatile coals injected. At the end of the period, melt conditions (see table 4) were evaluated aided by a sublance and corroborated with samples taken by the same sublance. The oxidizing period is then started by both: interruping coal flow and switching to powdered lime injection, leaving oxygen and natural gas flowing at about same flow rates as in the reducing period, and by the addition through the top of the vessel of 700-1200 Kgs. of solid metallic charge (sponge iron see table 5) along with lumpy lime in order to counteract the agressiveness of the slag generated by the ash coming form the coal injected and the gangue from the sponge iron added. This operation takes about 2 minutes or less and after this, the period lasts 2 more minutes and the condition of the melt at the end of the period as evaluated by sublance operation are shown in table 6. The off gas composition obtained during the period being characteristically rich in CO is also shown in table 6.

The process follows repeatedly reducing and oxidizing alternating periods until a stage is reached where the volume of molten metal in the vessel is sufficient to complete both a heat and an ignition heel. This stage is achieved after 8-12 cycles have been performed.

Before tapping, an oxidizing period is carried out by oxygen injection to a degree of refining as required in order to tap either molten iron or law steel. In this last case carbon content in the metal is lowered to less than 0.5%C and a typical tap temperature is 1600° C.-1650° C.

TABLE I

Metal conditions at the start of a reducing period with ignition heel.

| | |
|---|---|
| Heel = | 5.5 to 6.5 ton |
| Temperature = | 1500 to 1550° C. |
| [% C] = | 1.0 to 1.5 |
| [% S] = | 0.04 to 0.06 |

TABLE II

Gas and powdered solids injection flowrates used in reducing and oxidizing periods.

| | |
|---|---|
| Oxygen = | 23 to 28 Nm$^3$/min |
| Coal = | 30 to 100 Kg/min |
| Natural gas = | 2 to 3 Nm$^3$/min |
| Lime = | 20 to 40 Kg/min |
| Nitrogen = | 3 to 5 Nm$^3$/min |

TABLE III

Composition of coals used (dry basis)

| | Medium volatile | Low volatile |
|---|---|---|
| Fixed carbon = | 60 to 65% | 70 to 75% |
| Ash = | 10 to 15% | 10 to 15% |
| Volatile matter = | 21 to 25% | 15 to 20% |
| Sulfur = | 0.5 to 1.2% | 0.5 to 1.2% |
| Moisture = | 0.5 to 2.0% | 0.5 to 2.0% |

TABLE IV

Metal conditions obtained at the end of a reducing period and off gas composition produced during the same period.

| Metal: Injecting medium or low volatile matter coal | | |
|---|---|---|
| Temperature = | 1450 to 1500° C. | |
| [% C] = | 2.0 to 4.0 | |
| [% S] = | 0.06 to 0.09 | |
| Off gas: | Medium volatile coal | Low volatile coal |
| Volume [Nm$^3$/min] = | 80 to 90 | 70 to 80 |
| [% CO] = | 55 to 60 | 60 to 65 |

TABLE IV-continued

Metal conditions obtained at the end of a reducing period and off gas composition produced during the same period.

| | | |
|---|---|---|
| [% H$_2$] = | 25 to 30 | 20 to 25 |
| [% CO$_2$] = | <1% | <1% |
| [% N] = | Balance | Balance |

TABLE V

Sponge iron composition

| | |
|---|---|
| % Fe tot. = | 88% |
| % Fe met. = | 75% |
| % Fe as FeO = | 15% |
| % C = | 2% |
| % S = | 0.010% |
| % Gangue = | Balance |

TABLE VI

Metal conditions obtained at the end of an oxidizing period and off gas composition produced along the same period.

| Metal | |
|---|---|
| Temperature = | 1500 to 1550° C. |
| [% C] = | 1 to 1.5 |
| [% S] = | 0.04 to 0.06 |
| Off gas | |
| Volume = | 40 to 60 Nm$^3$/min |
| [% CO] = | 80 to 95 |
| [% H$_2$] = | 2 |
| [% CO$_2$] = | 5% |
| [% N] = | Balance |

Although the present invention has been described, it is to be understood that modifications and variations may be resorted to, without departing from the spirit of the invention. Such modifications and variations are considered to be within the scope of the present invention as defined by the appended claims.

What is claimed is:

1. A semicontinuous process to produce steel or iron by conducting repetitive refining operations on a charge in a metallurgical vessel, said process comprising:

(a) providing an initial quantity of molten metal in a metallurgical vessel;

(b) conducting a reducing period on the molten metal contained in the metallurgical vessel, the reducing period including the simultaneous bottom injection into the vessel of carbonaceous material and oxygen, the carbonaceous material having a carbon (kg) to oxygen (Nm3) ratio between 1 and 2.5, so that the carbon content in the molten metal increases to between 2% to 4% by weight to provide a positive variation of carbon in the melt with respect to time ($d(\%C)/dt > 0$) and thereby increasing latent heat of the melt and superheating of the melt;

(c) conducting an oxidizing period on the molten metal, the oxidizing period including charging a quantity of solid metallic charge and fluxes into the vessel and melting the metallic charge by performing exclusively oxygen injection to provide a negative variation of carbon content in the melt with respect to time ($d\%(\%C)/dt < 0$) to about 1% by weight to produce a mass of metal and slag wherein one reducing period and one oxidizing period constitute an operating cycle;

(d) continuing alternating periods of reduction and oxidation, including tapping slag produced after at least 2 operating cycles and immediately after an oxidizing period, the tapping conducted through a slag notch in the vessel, the slag notch being offset by 90 from a vessel trunnion axis; and (e) after a mass of metal is obtained, tapping the molten metal through a steel notch in the vessel, the steel notch being offset by 180 from the slag notch and at such a height that after metal tapping a metallic ignition heel remains within the metallurgical vessel in order to initiate a succeeding series of operating cycles.

2. A process as claimed in claim 1, wherein the vessel is sealed by a retractable bell during one of a reducing period and an oxidizing period in order to collect reducing gases given off during the process, the reducing gases having a H2/CO ratio high enough to permit the gases to be used in a process of direct reduction of iron ore or in a combustion process after compression.

3. A process, as claimed in claim 1, wherein the metallic charge is selected from the group consisting of sponge iron, iron ore, steel scrap and mixtures thereof.

4. A process as claimed in claim 1, wherein the metallic ignition heel is removed with the metal produced upon termination of the process and is replaced by liquid metal selected from the group consisting of pig iron, steel and iron from an external source to provide an initial charge for subsequently carrying out the process.

5. A process as claimed in claim 1, wherein the metallic ignition heel is removed with the metal produced upon termination of the process and is replaced by charging a solid metallic charge to be melted by an additional melting period carried out by bottom injection of oxygen and liquid/gaseous hydrocarbons to provide an initial charge for subsequently carrying out the process.

6. A process as claimed in claim 1 wherein the process is conducted in an oxygen converter.

7. A process as claimed in claim 1, wherein the metallic ignition heel is removed with the metal produced upon termination of the process and is replaced by charging a solid metallic charge to be melted by an additional melting period carried out by bottom injection of oxygen and liquid/gaseous hydrocarbons and oxygen by a top lance to provide an initial charge for subsequently carrying out the process.

8. A process as claimed in claim 1, wherein the carbonaceous material that is injected during the reducing period is selected from the group consisting of: anthracite; low, medium and high volatile matter bituminous coals; coke breeze; petroleum coke; charcoal; oil refining residues; fuel oil; and mixtures thereof.

* * * * *